(12) United States Patent
Henzler et al.

(10) Patent No.: US 11,866,021 B2
(45) Date of Patent: Jan. 9, 2024

(54) METHOD AND DEVICE FOR PREVENTING A FORWARD FLIP-OVER OF A SINGLE-TRACK MOTOR VEHICLE

(71) Applicant: Robert Bosch GmbH, Stuttgart (DE)

(72) Inventors: Markus Henzler, Stuttgart (DE); Florian Bauer, Markgroeningen (DE); Markus Lemejda, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 344 days.

(21) Appl. No.: 17/024,348

(22) Filed: Sep. 17, 2020

(65) Prior Publication Data
US 2021/0114568 A1  Apr. 22, 2021

(30) Foreign Application Priority Data
Oct. 17, 2019  (DE) .......................... 102019216056.5

(51) Int. Cl.
*B60T 8/17* (2006.01)
*B60T 8/172* (2006.01)

(52) U.S. Cl.
CPC ............ *B60T 8/1706* (2013.01); *B60T 8/172* (2013.01); *B60T 2230/03* (2013.01); *B60T 2240/06* (2013.01); *B60T 2270/10* (2013.01)

(58) Field of Classification Search
CPC .... B60T 8/1706; B60T 8/172; B60T 2230/03; B60T 2240/06; B60T 2270/10
See application file for complete search history.

(56) References Cited

U.S. PATENT DOCUMENTS

| | | | |
|---|---|---|---|
| 2003/0066720 A1* | 4/2003 | Sakamoto | B60T 8/1706 188/177 |
| 2003/0122419 A1* | 7/2003 | Sakamoto | B60T 8/1706 303/166 |
| 2010/0023235 A1* | 1/2010 | Kremer | B60T 8/261 701/70 |
| 2013/0090828 A1* | 4/2013 | Lemejda | B60W 30/045 701/90 |
| 2014/0214300 A1* | 7/2014 | Hasegawa | B62L 3/023 701/79 |
| 2015/0232074 A1* | 8/2015 | Iizuka | B60T 8/172 701/34.1 |
| 2016/0009275 A1* | 1/2016 | Hieda | B60T 8/1706 701/70 |
| 2016/0086285 A1* | 3/2016 | Jordan Peters | G08G 1/096827 701/484 |
| 2017/0101008 A1* | 4/2017 | Hirokami | B60K 28/10 |
| 2018/0072286 A1* | 3/2018 | Hirokami | B60T 8/1706 |
| 2018/0265057 A1* | 9/2018 | Hasegawa | B60T 8/172 |

(Continued)

FOREIGN PATENT DOCUMENTS

DE   102013217593 A1   3/2015

*Primary Examiner* — Sze-Hon Kong
(74) *Attorney, Agent, or Firm* — NORTON ROSE FULBRIGHT US LLP; Gerard A. Messina

(57) ABSTRACT

A method for preventing a forward flip-over or a flip-over about the vehicle transverse axis of a single-track motor vehicle, during a braking action of its front wheel. In the method, a lift-off indicator parameter is ascertained, which represents the flip-over hazard by a rear wheel at risk of lifting off or already having lifted off the ground surface, and the braking force at the front wheel is reduced as a function thereof to prevent a flip-over.

9 Claims, 1 Drawing Sheet

(56) References Cited

U.S. PATENT DOCUMENTS

| | | | |
|---|---|---|---|
| 2018/0265058 A1* | 9/2018 | Hasegawa | B60T 8/50 |
| 2019/0176622 A1* | 6/2019 | Suzuki | B62J 45/415 |
| 2019/0315345 A1* | 10/2019 | Newman | B60W 50/14 |
| 2020/0072637 A1* | 3/2020 | Guidotti | G01C 21/3461 |
| 2020/0156605 A1* | 5/2020 | Hamm | B60T 8/1706 |
| 2020/0173549 A1* | 6/2020 | Hofmann | B60T 8/17616 |
| 2020/0368629 A1* | 11/2020 | Moss | A63H 17/004 |
| 2020/0371515 A1* | 11/2020 | Westbrook | G06F 3/015 |
| 2021/0024058 A1* | 1/2021 | Balakrishnan | G06Q 50/30 |
| 2021/0107477 A1* | 4/2021 | Kim | B60W 40/02 |
| 2021/0206359 A1* | 7/2021 | Nakamura | B62L 3/023 |
| 2021/0370897 A1* | 12/2021 | Cappelletti | B60T 8/17554 |
| 2022/0244736 A1* | 8/2022 | Konrardy | G06Q 40/08 |

* cited by examiner

METHOD AND DEVICE FOR PREVENTING A FORWARD FLIP-OVER OF A SINGLE-TRACK MOTOR VEHICLE

CROSS REFERENCE

The present application claims the benefit under 35 U.S.C. § 119 of German Patent Application No. 102019216056.5 filed on Oct. 17, 2019, which is expressly incorporated herein by reference in its entirety.

BACKGROUND INFORMATION

German Patent Application No. DE 10 2013 217 593 A1 describes a method for ascertaining a maximum permissible braking deceleration of a single-track vehicle for avoiding a forward flip-over, in which
the overall inclination of the vehicle about its transverse axis with respect to the direction of earth's gravity is ascertained, and
a maximum permissible deceleration value is ascertained as a function of the ascertained overall inclination.

SUMMARY

The present invention relates to a method for preventing a flip-forward over, or a flip-over about the vehicle transverse axis, of a single-track motor vehicle, during a braking action of its front wheel, in which
a lift-off indicator parameter is ascertained, which represents the flip-over hazard by a rear wheel at risk of lifting off or already having lifted off the ground surface, and
the braking force at the front wheel is reduced as a function thereof to prevent a flip-over.

One advantageous example embodiment of the present invention includes that a faster and/or stronger braking force reduction at the front wheel occurs as the flip-over hazard increases.

One advantageous example embodiment of the present invention includes that the lift-off indicator parameter is ascertained as a function of the pitch angle, the pitch angle velocity, as well as the float angle of the rear wheel.

One advantageous example embodiment of the present invention includes that:
a pitch angle indicator parameter is ascertained as a function of the pitch angle of the motor vehicle;
a pitch angle velocity indicator parameter is ascertained as a function of the pitch angle velocity of the motor vehicle;
a float angle indicator parameter is ascertained as a function of the float angle of the rear wheel; and
the lift-off indicator parameter is ascertained as a function of the pitch angle indicator parameter, the pitch angle velocity indicator parameter, and the float angle indicator parameter.

One advantageous example embodiment of the present invention is characterized in that the lift-off indicator parameter is ascertained by summation of the pitch angle indicator parameter, the pitch angle velocity indicator parameter, as well as the float angle indicator parameter.

One advantageous example embodiment of the present invention is characterized in that the single-track motor vehicle is a motorcycle.

The present invention furthermore includes a device, containing means (a device) designed for carrying out the method according to the present invention. This is, in particular, a control unit in which the program code for carrying out the method according to the present invention is stored.

The device is an anti-lock braking system, for example.

DETAILED DESCRIPTION OF EXAMPLE EMBODIMENTS

Modern two-wheelers are usually equipped as standard with an inertia measuring technology which is used to detect different vehicle dynamics data. These vehicle dynamics data allow the ascertainment of a stability indicator, which represents the stability of the two-wheeler with respect to a lift-off hazard of the rear wheel or, going beyond that, of a lifted-off rear wheel. As a function thereof, a present braking force or a present braking pressure may be reduced at the front wheel. As a result, the contact force of the rear wheel increases again, and the rear wheel is thus brought more firmly against the roadway. A lifted-off rear wheel is brought back onto the roadway by the pressure reduction at the front wheel.

The estimation for parameters such as the pitch angle, the pitch rate, and also the float angle takes place, for example, in the control unit of the anti-lock braking system. Furthermore, the wheel speeds may also be incorporated in the ascertainment of the aforementioned parameters.

The stability indicator is an abstracted parameter for mapping the stability of a two-wheeler with respect to a lift-off of the rear wheel during a brake application. In one configuration stage, the value may range between 0 and 1, 0 representing a stable two-wheeler, and 1 representing an unstable two-wheeler. A stable two-wheeler in this connection means that the rear wheel has a good, permanent ground contact, while a maximally unstable two-wheeler has a highly lifted-off rear wheel just prior to the flip-over of the motorcycle. An additionally increased instability is present when the lifted-off rear wheel is heavily laterally offset and has a large float angle.

To form the stability indicator, at least one of the following parameters is evaluated:
the pitch angle;
the pitch rate; and
the float angle.

The pitch angle is the rotation angle of the two-wheeler about its transverse axis. The pitch rate is the time derivative of the pitch angle, or the change of the pitch angle per unit of time, and may also be referred to as the pitch angle velocity.

Figure 1:
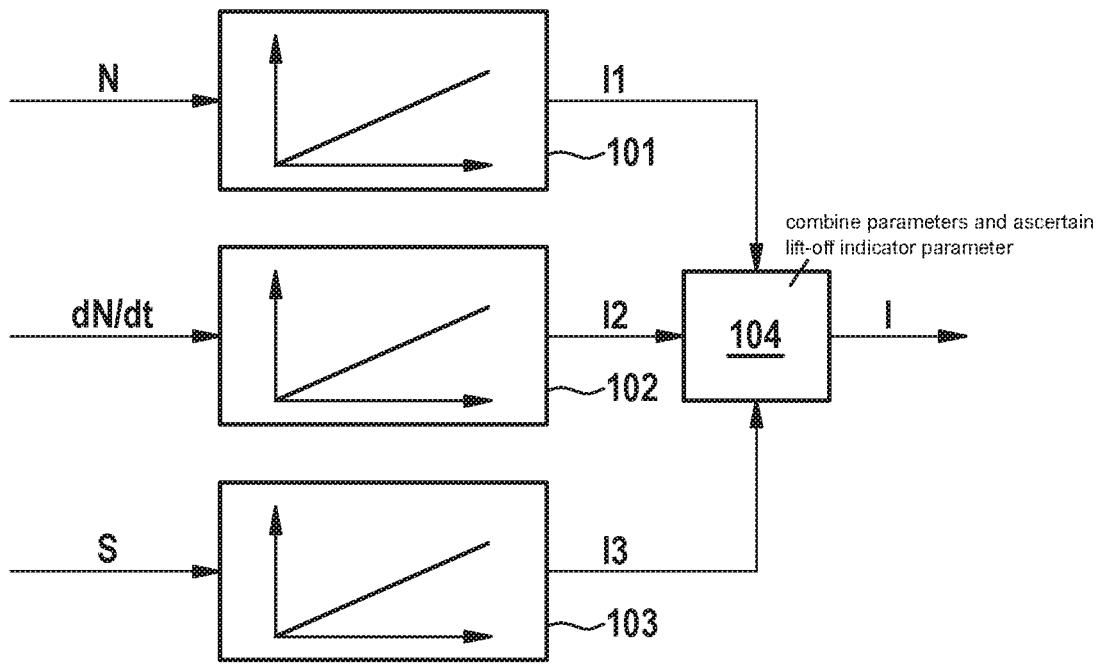
FIG. 1 shows the determination of the stability indicator in the form of a block diagram for one specific embodiment.

The structure of one example embodiment of the present invention is shown in FIG. 1. Pitch angle N, pitch rate dN/dt as well as float angle S serve as input variables. In block 101, a parameter I1 which represents the flip-over hazard resulting from the pitch angle is ascertained from pitch angle N. In block 102, a parameter I2 which represents the flip-over hazard resulting from the pitch rate is ascertained from pitch rate dN/dt, and in block 103, the flip-over hazard resulting from the float angle, which is represented by indicator parameter I3, is ascertained based on float angle S of the rear wheel.

In blocks 101, 102 and 103, characteristic curves are shown in each case by way of example, the respective input variable N or dN/dt or S being plotted in the x-axis direction, and the associated indicator parameter I1 or I2 or I3 being plotted in the y-axis direction.

While three indicator parameters I1, I2 and I3 are ascertained in FIG. 1, in the simplest case an indicator or criterion may be derived from only one of the input variables. The characteristic curves shown in blocks 101, 102 and 103 are represented as linear characteristic curves. In the simplest case, however, these characteristic curves may also only represent a query as to whether the input variable has exceeded a predefined threshold value. For example, I1=1 is set when pitch angle N exceeds a predefined threshold value N0. However, if N<N0, then I1=0 is set.

Of course, the individual characteristic curves may also map arbitrarily complex, non-linear relationships.

In block 104, parameters I1, I2 and I3 are suitably combined, and a lift-off indicator parameter I is ascertained therefrom.

In the simplest case, the sub-criteria are added, i.e., I=I1+I2+I3. I may be limited to a maximum value of 1 by a standardization.

Of course, a more complicated combination of the individual indicators may also take place.

Figure 2:
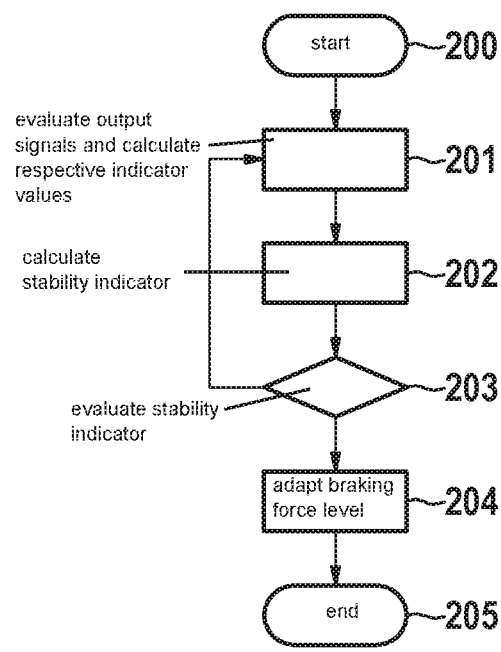
FIG. 2 shows the sequence of one embodiment of the method according to the present invention.

The sequence of one example embodiment of the method in accordance with the present invention is illustrated in FIG. 2. After the start of the method in block 200, in block 201 the output signals of the sensors are evaluated, and the respective indicator values based thereon are calculated. The stability indicator is calculated from the individual values in block 202. This indicator is evaluated in a next step 203. Depending on the result of the evaluation, a different adaptation of the braking force level at the front wheel brake occurs in block 204.

When, in block 204, the value of the indicator, for example, exceeds a previously set maximum value threshold, this means a high likelihood for a rear wheel at risk of lifting off or having lifted off. A downward adaptation of the braking force is thus carried out. If the indicator indicates a stable vehicle, the braking force level may even be upwardly adapted at the front wheel. The braking force level always remains below or equal to the driver's specification in the process, i.e., does not exceed the driver's specification.

The method restarts by the back-coupling from block 203 to block 201 and ends in block 205 when the driver ends the brake application.

What is claimed is:

1. A method for preventing a forward flip-over of a single-track motor vehicle during a braking action of a front wheel, the method comprising the following steps:
   ascertaining, for each of a plurality of dynamics characteristics of the motor vehicle that are respectively obtained from respective output of sensors of the motor vehicle, a respective value of a risk that a rear wheel of the of the motor vehicle will lift off a ground surface or has lifted off the ground surface;
   ascertaining a lift-off indicator parameter based on a combination of all of the ascertained values of the risk, wherein the ascertained lift-off indicator parameter represents a present risk of occurrence of a flip-over of the motor vehicle by lift off of the rear wheel; and
   reducing a braking force at the front wheel as a function of the ascertained lift-off indicator parameter to prevent the forward flip-over;
   wherein the method includes at least one of the following two features (a) and (b):
   (a) the plurality of dynamics characteristics includes a pitch angle of the motor vehicle, a pitch angle velocity of the motor vehicle, and an angle characterizing a lateral offset of the rear wheel; and
   (b) the combination is a mathematical summation adding to one another the values of the risk ascertained for the plurality of dynamics characteristics.

2. The method as recited in claim 1, wherein, as the flip-over hazard increases, a faster braking force reduction at the front wheel occurs, and/or a stronger braking force reduction at the front wheel occurs.

3. The method as recited in claim 1, wherein the plurality of dynamics characteristics includes the pitch angle of the motor vehicle, the pitch angle velocity of the motor vehicle, and the angle characterizing the lateral offset of the rear wheel.

4. The method as recited in claim 1, wherein the single-track motor vehicle is a motorcycle.

5. The method as recited in claim 1, wherein the combination is the mathematical summation adding to one another the values of the risk ascertained for the plurality of dynamics characteristics.

6. The method as recited in claim 1, wherein each of at least one of the values of the risk is ascertained by a comparison of a corresponding value from the sensors of the motor vehicle to a respective predefined threshold value.

7. A method for preventing a forward flip-over of a single-track motor vehicle during a braking action of a front wheel, the method comprising the following steps:
   ascertaining a pitch angle indicator parameter as a function of a pitch angle of the motor vehicle;
   ascertaining a pitch angle velocity indicator parameter as a function of a pitch angle velocity of the motor vehicle;
   ascertaining a lateral offset angle indicator parameter as a function of an angle characterizing a lateral offset of the rear wheel;
   ascertaining a lift-off indicator parameter by summation of the pitch angle indicator parameter, the pitch angle velocity indicator parameter, and the lateral offset angle indicator parameter, wherein the lift-off indicator parameter represents a flip-over hazard by a rear wheel at risk of lifting off a ground surface or already lifted off the ground surface; and
   reducing a braking force at the front wheel as a function of the ascertained lift-off indicator parameter to prevent a flip-over.

8. A device comprising a control unit, wherein the control unit is configured to prevent a forward flip-over of a single-track motor vehicle during a braking action of a front wheel by:
   ascertaining, for each of a plurality of dynamics characteristics of the motor vehicle that are respectively obtained from respective output of sensors of the motor vehicle, a respective value of a risk that a rear wheel of the of the motor vehicle will lift off a ground surface or has lifted off the ground surface;
   ascertaining a lift-off indicator parameter based on a combination of all of the ascertained values of the risk, wherein the ascertained lift-off indicator parameter represents a present risk of occurrence of a flip-over of the motor vehicle by lift off of the rear wheel; and
   reducing a braking force at the front wheel as a function of the ascertained lift-off indicator parameter to prevent the forward flip-over;
   wherein the device includes at least one of the following two features (a) and (b):

(a) the plurality of dynamics characteristics includes a pitch angle of the motor vehicle, a pitch angle velocity of the motor vehicle, and an angle characterizing a lateral offset of the rear wheel; and (b) the combination is a mathematical summation adding to one another the values of the risk ascertained for the plurality of dynamics characteristics.

9. The device as recited in claim 8, wherein the device is an anti-lock braking system.

\* \* \* \* \*